United States Patent [19]

Muller

[11] Patent Number: 4,770,747
[45] Date of Patent: Sep. 13, 1988

[54] VAPRO LIQUID DEENTRAINMENT APPARATUS

[75] Inventor: Herbert M. Muller, Sea Girt, N.J.

[73] Assignee: Mobil Oil Corporation, New York, N.Y.

[21] Appl. No.: 110,813

[22] Filed: Oct. 21, 1987

[51] Int. Cl.$^4$ .......................... B01D 3/06; C10G 7/00
[52] U.S. Cl. .................................... 202/176; 202/197;
    55/204; 159/2.1; 159/43.1; 196/125; 196/135;
    203/88; 208/352; 208/361
[58] Field of Search ................ 55/204; 202/197, 176,
    202/175, 177, 158, 205; 203/40, 88; 208/361,
    352; 196/127, 135, 114, 125, 126; 159/43.1, 2.1,
    6.1, 901; 122/40, 488–492

[56] References Cited

U.S. PATENT DOCUMENTS

| | | | |
|---|---|---|---|
| 2,756,837 | 7/1956 | Lovelady et al. | 55/204 |
| 2,809,923 | 10/1957 | Hausch | 208/361 |
| 2,897,147 | 7/1959 | Lely et al. | 196/114 |
| 3,080,300 | 3/1963 | Smith | 196/114 |
| 4,270,975 | 6/1981 | Bennett | 202/197 |
| 4,308,105 | 12/1981 | Schiffers et al. | 202/197 |
| 4,315,815 | 2/1982 | Gearhart | 203/40 |
| 4,714,542 | 12/1987 | Lockett | 196/127 |

Primary Examiner—Wilbur Bascomb
Attorney, Agent, or Firm—Alexander J. McKillop; Michael G. Gilman; Malcolm D. Keen

[57] ABSTRACT

An inlet horn for reducing liquid entrainment of liquid in vapor products in distillation towers. The inlet horn has a tangential entry for the vapor-liquid feed which opens into a peripheral open bottomed horn with a number of deflector vanes angularly disposed horizontally and vertically along the length of the horn to deflect liquid components of the feed radially outwards and vapor components downwards so as to improve their separation. The horn may be used in atmospheric and vacuum crude distillation and other vapor-liquid separation units.

20 Claims, 5 Drawing Sheets

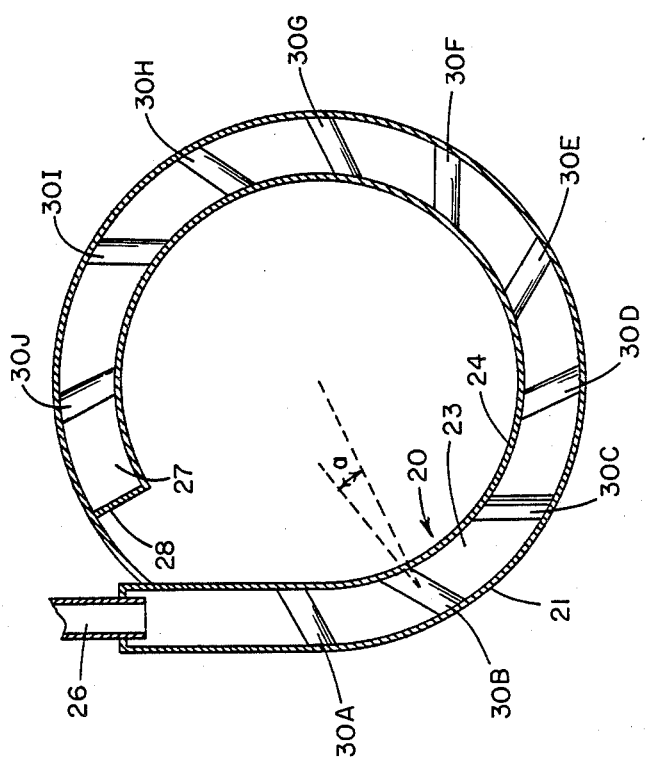
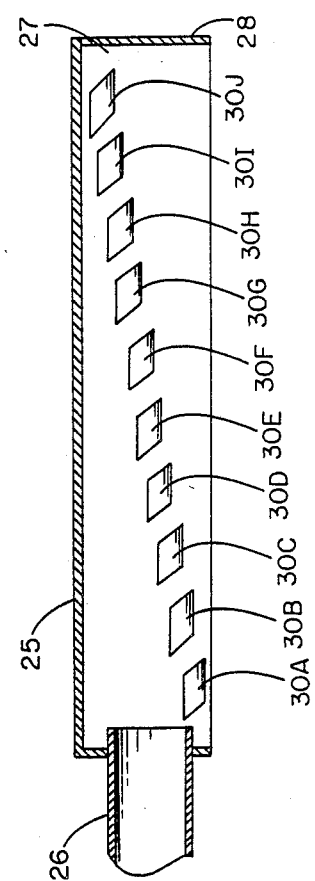
FIG. 2A
FIG. 2B

VAPRO LIQUID DEENTRAINMENT APPARATUS

FIELD OF THE INVENTION

This invention relates to the separation of entrained vapor and liquid in a hydrocarbon distillation tower using a tangential entry peripheral horn for introducing the feedstream into a flash zone.

BACKGROUND OF THE INVENTION

The design of petroleum crude oil distillation atmospheric towers and reduced crude oil distillation vacuum towers conventionally requires a flash zone into which a mixed phase feed of vapor-liquid is introduced from a feed heater. The flash zone separates an upper rectification zone and a lower stripping zone. The volatile vapor component rises to the bottom rectification tray and the liquid non-volatile residuum falls to the bottom steam stripping trays in which the more volatile components of the descending liquid are stripped and vaporized. The bottoms product is not volatile enough for the bottom draw off stream above the flash zone (gas oil stream) based on vapor-liquid equilibrium but at high feed rates for a tower of given, fixed diameter some undesirable, nonvolatile liquid may be carried up to the gas oil draw by entrainment of the nonvolatile liquid by the vapor, especially when cutting deep into the whole crude or reduced crude.

The undesirable entrained nonvolatile hydrocarbons generally include organo-metallic compounds which poison cracking catalysts. Also, heavy carbonaceous hydrocarbons included in the nonvolatile hydrocarbons limit the yield of high grade distillates or lube oil cuts. If the entrainment of the heavier components can be significantly reduced or eliminated, a significant improvement in the quality of the feed for hydroconversion units, catalytic cracking units and vacuum towers producing valuable gas oil distillates or lube oil distillates both in yield and quality will ensue.

The conventional method for minimizing liquid entrainment in crude distillate towers is to introduce the vapor-liquid feed tangentially into the flash zone through a nozzle into an internal peripheral horn. In a typical peripheral horn design of conventional type, an open-ended, open-bottomed arcuate horn or hood circumferentially abuts the shell wall of the tower. The horn is intended to thrust the liquid component of the heated feed against the tower wall by centrifugal force, causing the liquid to flow downwards by gravity to be collected for distribution across the bottom steam stripping trays; the vapor is intended to flow in a downward direction inside the horn, making a ninety degree to one hundred and eighty degree turn after which it flows up the flash zone toward the bottom rectifying tray with an approximately even velocity pattern. However, recent investigations in the operation of peripheral horns representative of the current state of the art have shown that about 90 to 95 percent of the incoming vapor emerges through the end of the horn, establishing cyclonic patterns of uneven vapor distribution through the flash zone and up through the rectification tray. Further, only a portion of the unflashed nonvolatile hydrocarbon liquid is swept to the inside of the tower shell to flow downward to the stripping trays, leaving the bulk of the remaining liquid to be swept along with the vapor to the flash zone. Because of the uneven velocity pattern striking the bottom rectification or deentrainment tray, through only 20 to 30 percent of its cross-sectional area, high entrainment can occur through the bottom several trays.

Several other types of devices have been employed in the prior art to reduce the entrainment such as demister pads, deentrainment trays, and arrestor plates.

The use of a demister for deentrainment has not been found completely satisfactory for a number of reasons: (1) entrainment in many cases is not significantly reduced; (2) the wire mesh pads have a tendency to plug up with heavy oil and other material such as coke; (3) a wire mesh pad has a tendency to form holes as a result of corrosion.

The installation of various types of deentrainment trays are described in U.S. Pat. No. 3,501,400 to Brody. Deentrainment trays experience problems in that the vapor velocity pattern to the deentrainment tray is not even. The vapor can carry appreciable quantities of entrained liquid with it well up to several fractionating trays above.

U.S. Pat. No. 4,315,815 to Gearhart describes an inlet horn which contains a number of corrugated inlet vanes to separate solid particles from solvent in a solvent recovery operation. The corrugated vanes are designed to cause both solvent and solid to flow down the walls of the stripper. Liquid-vapor separation is not intended or directly achieved in this device through the use of corrugated vanes.

A flash zone peripheral horn or conduit design to achieve vapor liquid deentrainment in crude distillation towers which is commercially available includes a plurality of radial vanes installed vertically in the conduit passageway of the inlet horn. They extend gradually around the horn at an increasing height from the bottom of the horn, approaching a closed conduit end. However, this design does not necessarily assure an even distribution of vaps shown through the vanes.

SUMMARY OF THE INVENTION

An improved inlet horn has now been devised which significantly reduces liquid entrainment in the distillate products in distillation towers including, for example, crude atmospheric towers, reduced crude vacuum towers and other hydrocarbon towers as well as in vapor-liquid separators used for feeding a vapor-liquid mixture into a flash zone for initially separating vapor and liquid. The inlet horn is capable of providing a uniform vapor velocity up through the flash zone to the bottom rectifying tray so as to reduce or eliminate liquid entrainment and also provides improved vapor-liquid separation of distillable chemicals and their mixtures.

According to the present invention, the inlet horn comprises an elongated, arcuate, generally horizontal passageway disposed about the interior shell wall of the flash zone. The conduit has a top wall and sidewalls that define a bottom opening. An open end is provided for receiving the crude oil feed, and a closed end in provided remote from the inlet. The passageway has a plurality of transverse vanes angularly disposed horizontally and vertically connecting the sidewall portions of the conduit which serve to deflect incoming liquid toward the shell wall while deflecting vapor in a downward direction. Typically, the conduit has a uniform cross-sectional passageway area from the open end to the closed end or, alternatively, is tapered in this direction. It is advantageous for the top portion of the angularly disposed transverse vanes and the top wall portion of the passageway to define a plurality of openings by having the tops of adjacent vanes staggered in a vertical direction.

The improved conduit or peripherial horn of the instant invention is effectively used in a process for the separation of liquid and vapor in the feedstream to the flash zone of a cylindrical distillation tower. The heated feed is passed through the conduit described above. Contacting the feed with the angularly disposed vanes deflects the liquid portion of the feed outward and a vapor portion of the feed downward. The liquid portion passes to a lower zone of the distillation tower for stripping while the vapor is passed to an upper zone for rectification, and the separated distilled products are collected.

THE DRAWINGS

FIG. 1A is a horizontal section of a conventional inlet horn for a distillation tower, FIG. 1B is a vertical section of the inlet horn of FIG. 1A along its axis (to different scale), FIG. 2A is a horizontal section of an inlet horn with the angularly disposed vanes, FIGS. 2B is a vertical section of the inlet horn of FIG. 2A along its axis (to different scale), FIG. 3 is an enlarged view showing the angular disposition of one vane, FIG. 4 is a simplified vertical section of a flash zone of a distillation tower with an inlet horn with angled deflector vanes.

DETAILED DESCRIPTION

Figure 1B:
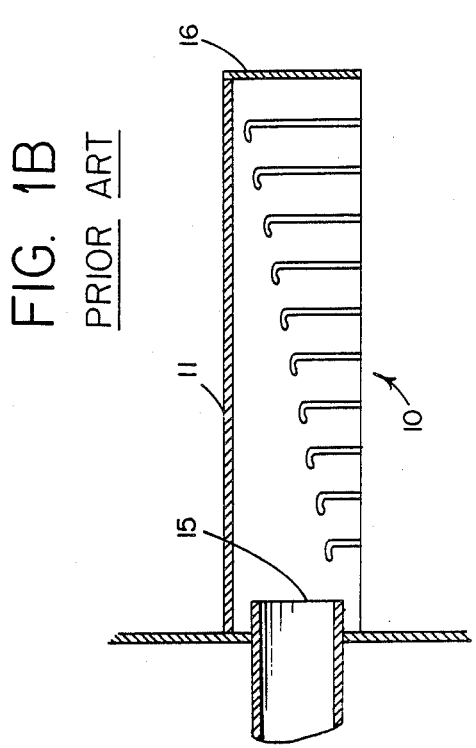
Figure 1A:
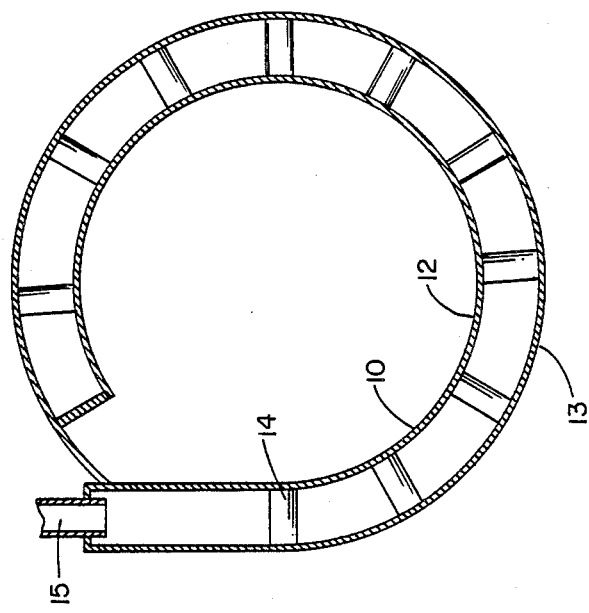

In the distillation of crude oils, atmospheric and vacuum tower bottoms, heavy oils and the like, the distillation tower typically consists of an upper rectification zone, a lower stripping zone and middle flash zone into which is fed a preheated distillation feed comprising vapor and liquid. When separation of the liquid and vapor phases is incomplete in the flash zone, entrainment occurs and undesirable liquid is carried upward with vapor into the rectification zone. To mitigate or eliminate such entrainment various feed inet devices have been developed as noted above, but most commonly, the heated feed is admitted to the flash zone through an inlet horn with a tangential entry conduit around the shell wall of the tower, the conduit curves arcuately to conform to the periphery of the flash zone adjacent the cylindrical shell wall. Referring to FIGS. 1A and 1B, a representation of a conventional peripheral horn is drawn in plan and vertical sectional along its axis (as if unrolled from the shell). The horn is an opened bottom conduit 10 with a top wall 11 and an inner sidewall 12. The conduit outer sidewall 13 is formed by the shell plating of the tower. A plurality of vertical vanes 14 with curved top ends connect the sidewalls at a 90° angle from the horizontal. The vanes increase in height from the inlet feed opening 15 to closed end 16 remote from the inlet. The intent is that both the liquid and vapor components of the feed will contact the vanes and be distributed downward through the open bottom of the horn where vapor will flow up to the rectification zone while liquid flows to the lower stripping zone. Unfortunately, designs of this type continue to present problems with respect to the even distribution of vapors down through the vanes and provide inadequate deentrainment of the liquid and vapor.

The peripheral inlet horn according to the present invention is equipped with staggered deflection vanes gradually elevated toward the closed end of the horn. Each vane is tilted at an angle from 30° to 60°, usually approximately 45° from the vertical plane and at an angle of 30° to 60°, usually approximately 45° from the tower radius in the horizontal plane at the centerline of the horn. The vertical inclination of the vanes gives the lower density vapor in the feed an overall downward component of direction which is reversed as the vapor spills around the lower edge of the interior sidewall of the horn and makes a 180° change in direction. The vapors then proceed verticallly upward in the direction of the bottom rectifying tray. A uniform pressure gradient from the open end to the closed end of the horn forces the vapors to be evenly distributed around the periphery of the horn. The horizontal inclination of the deflection vane gives the high density liquid an overall horizontal component of force outwards towards the tower wall. The liquid so separated flows downward by gravity to the tower bottom or stripping zone.

The inlet horn appreciably improves the separation of vapor liquid, minimizing or eliminating liquid entrainment and equalizing vapor velocity patterns to the bottom rectifying tray. A centrifugal force is exerted upon the liquid vapor feed entering the curved horn such that the liquid and vapor components are directed outward but the force on the liquid is substantially greater than the centrifugal force acting upon the vapor because the liquid is more dense so that a separation of the two components occurs. On the other hand, the vapor component or phase of the feedstream, impacting upon the angularly disposed vanes, is directed in a generally downward direction because of the vertical pressure gradient within the peripheral horn which proceeds from a higher pressure in the liquid vapor space immediately above a vane to a lower pressure at the bottom of the horn, to a still lower pressure in the flash zone above the horn. This causes the vapor to sweep up from the bottom of the horn and to be directed up toward the first tray of the rectification zone.

Referring to FIGS. 2A and 2B, the horn comprises a curved or arcuate conduit 20 installed horizontally in contact with the interior shell wall 21 of the flash zone of the distillation tower. The outer sidewall of the conduit that defines the inlet passageway 23 is the shell tower wall 21 with the inner sidewall 24 of the conduit attached to upper wall 25. An inlet 26 is provided for the feed at one end of the horn and the opposite end 27 remote from the inlet is closed by end wall 28. The horn may be tapered from a larger cross-sectional area adjacent inlet 26 to a smaller cross-sectional area adjacent closed end 27 but a non-tapered conduit or passage is shown in the drawings. The bottom of the horn is open and in communication with the flash zone. The bottom opening preferably extends completely from sidewall to sidewall but may be partly closed. The top and sidewalls of the horn describe three connecting sides of a rectangle, although other geometric cross-sectional shapes are suitable, such as, for example, a tubular peripheral horn where the top and sidewalls are respectively the top and sides of a generally circular cross-section of a tube having an open bottom.

Feed inlet 26 extends through shell 21 of the tower to receive feed in a direction tangential to the circumference of the shell. That direction changes curvilinearly along the horn until reaching closed end 27 so that a centripetal force is exerted upon the feed as it passes along the horn. A plurality of angularly disposed vanes 30A . . . 30J are connected within the passageway of the conduit between the sidewalls to interdict the flow of feed from the inlet to the closed end of the horn and deflect and separate vapor and liquid phases of the feed. Each vane is canted toward the inlet opening in a manner such as to form an angle of between 10° to 80°, usually 30° to 60° but preferably 45°, from the vertical. In addition, each vane is canted in the horizontal plane with its inner edge (i.e. the edge attached to inner sidewall 24) towards the inlet end of the horn so that the horizontal centerline of each vane forms an angle between 10° to 80°, usually 30° to 60°, but preferably about 45°, from the tower radius in the horizontal plane as shown in FIG. 2A.

As shown in FIG. 2B, the vanes are connected to the sidewalls of the conduit such that the horizontal centerline, top edge and lower edge of the vanes gradually increase in elevation from a low elevation at the inlet end to a higher elevation at the closed end of the horn. The elevation of the top edge of the first vane adjacent inlet 26 overlaps the elevation of the bottom portion of the inlet orifice to deflect an initial portion of the feed downwards. The elevation of the top edge of each successive vane is higher than the elevation of the top edge of the immediately preceding vane; the elevation of the lower edge of the immediately preceding vane is lower than the elevation of the top edge of the next succeeding vane. In this manner the vanes form a vertically staggered, stepwise, overlapping configuration proceeding from the inlet end 26 to the closed end 27. The staggered configuration of the vanes defines an open passageway of progressively decreasing cross-sectional area above the vanes in which the liquid/vapor feed flows from the inlet until interdicted by a vane and deflected downwards and outwards.

The horn may be tapered in both the vertical and horizontal planes in order to allow for the decreasing volume of feed at different points along the length of the horn. Vertical tapering may be provided by cutting away the lower parts of the inner sidewall below the vanes and horizontal tapering by narrowing the top wall towards the end remote from the inlet.

Figure 3:
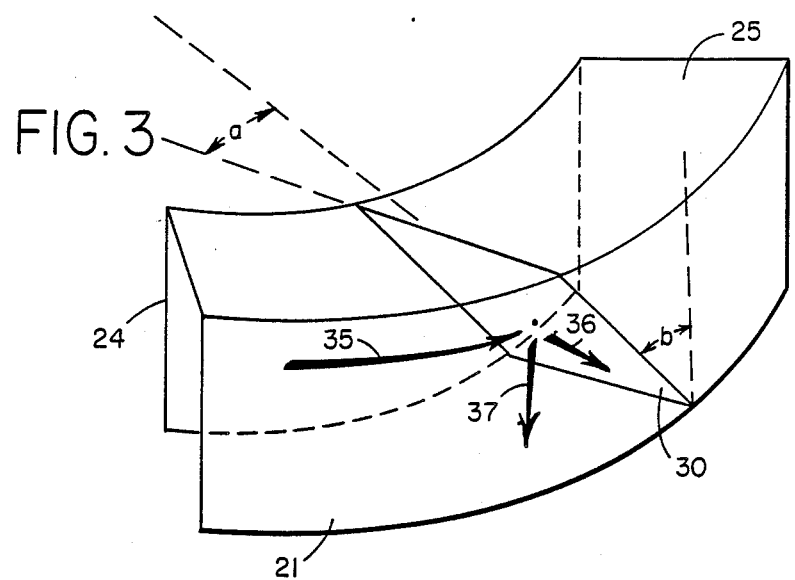

FIG. 3 illustrates the one disposition of deflector vane 30 in the conduit. The internal vessel shell wall 21 forming the exterior horn wall is connected to interior horn wall 24 by means of top wall 25. Deflector vane 30 is fixed to the side walls by welding. The vane is tilted vertically at 45° from the vertical (angle a) and horizontally at 45° from the radius 31 of the tower (angle b). Vapor-liquid feed, shown by vector 35, strikes the deflector vane and liquid is deflected towards the wall, as shown by vector 36, while vapor is deflected vertically downward as shown by vector 37 through the open bottom of the horn. The deflected vapor turns through 180° over the lower edge of interior horn wall 29, rising upward to the distillation tower rectification zone. Liquid deflected horizontally outwards towards the shell passes by the gravity down the shell wall to the bottom of the distillation tower.

The deflector vanes installed in a staggered fashion along the passageway of the peripheral inlet horn effectively separate vapor and liquid, with separation taking place evenly along the arc length of the horn. Accordingly, the volume of vapor spilling over the interior edge of the horn into the flash zone after separation is essentially constant at any one time along the arc length of the interior edge. Thus, the first rectification tray of the rectification zone receives an essentially constant volume of vapor uniformly across the area of that tray at any one moment, providing a further improvement in the separation of vapor and avoiding further entrainment of liquid and vapor. This advantageous and even distribution of vapor from the peripheral zone is achieved by the unique disposition of the deflector vanes. The vane design controls the feed pressure drop from inlet end to closed end, thereby controlling the driving force upon the vapor as separated and deflected within the peripheral horn.

As a specific example of the operation of a horn of the type shown in FIG. 2, the feed pressure drop through the horn as determined at each vane of a ten vane horn is as presented in Table 1 below.

TABLE 1

| Inlet Horn Pressure Distribution | |
|---|---|
| Vane | Pressure(psi) |
| Inlet | 30.0 |
| 30A | 29.96 |
| 30B | 29.92 |
| 30C | 29.88 |
| 30D | 29.84 |
| 30E | 29.80 |
| 30F | 29.76 |
| 30G | 29.72 |
| 30H | 29.68 |
| 30I | 29.64 |
| 30J | 29.60 |

The pressure drop along the peripheral horn equals 0.04 psi per vane and that pressure drop is constant along the length of the horn.

Figure 4:
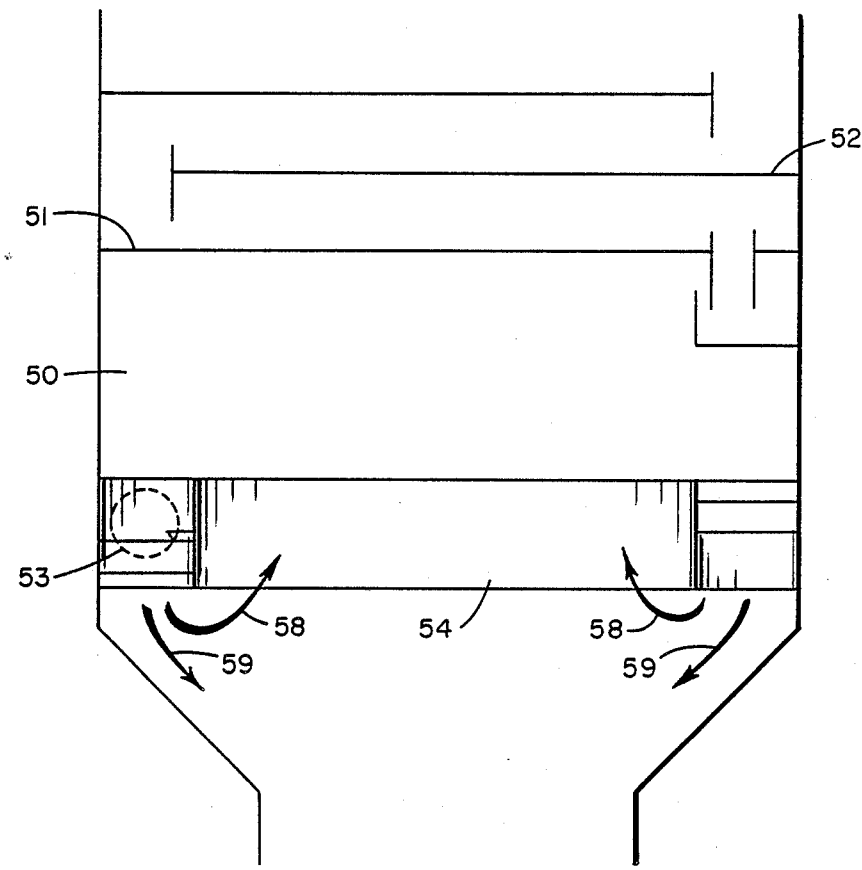

Turning now to FIG. 4, a sketch is shown of the side view of the flash zone 50 in a tower with rectification trays 51, 52 and an inlet 53 at one end of a vapor-liquid peripheral inlet horn 54. Feed enters through inlet 53 at a typical pressure of about 30.0 psi. Vapor leaves the horn along vectors 58 and liquid along vectors 59. As the average flash zone pressure is about 29.56 psi, the differential between the feed inlet of 30 psi and the average flash zone pressure drives the vapor separated in the peripheral horn into the flash zone and upward toward the rectification trays 51, 52. The pressure drop through the rectification trays is about 0.2 psi per tray. Accordingly, in the example shown, the pressure above the second rectification tray is approximately 29.16 psi, further illustrating the scope of the pressure gradient through the vanes and up through the fractionating trays.

The inlet horn may be utilized for distillations conducted at superatmospheric, atmospheric and subatmospheric pressures and is applicable to the distillation of feeds such as petroleum crude oils, natural gas condensate, residua, heavy oils, and the like. It may also be used in the distillation of feeds other than petroleum and petroleum refining derived liquids and liquid-vapor mixtures. Such feeds include mixtures of organic and inorganic solvents, mixtures of organic oxygenates, organic oxygenates and water and mixtures of distillable natural products.

The precise dimensions of the peripheral inlet horn depnd, in the first instance, on the type, quantity, and desired distillation rate of the feed to be distilled. Also to be considered is the vapor-liquid feed ratio, vapor and liquid density, and the flash zone pressure. From the foregoing factors, the design dimensions for the deflection vanes in the horn may be determined. These design dimensions include: the radius of the centerline of the horn, the radius of the horn, the radius of the tower shell, the center angle between deflection vanes, the diameter of the inlet nozzle, the circumference of the centerline of the horn, the width of the horn, the height of the horn, the number of deflection vanes, the degree of overlap of vertical distance between the top of vanes, and the distance from the bottom of the inlet nozzle to the top of the fist vane.

In utilizing the horn, a feed, such as those noted above is preheated, and passed to the inlet of the horn. The vapor and liquid components of the feed separate in the peripheral horn which is within the flash zone of the distillation tower by contacting the vapor-liquid feed with the angularly disposed vanes of the horn. The separated liquid passes to a lower section of the distillation tower where it can be collected or stripped to accomplish further separation. The vapor component of the feedstream separated in the horn passes to an upper tower zone for rectification and collection of the distilled separated products. The degree of rectification and separation can be determined by conventional means to meet predetermined requirements with respect to distilled product purity.

I claim:

1. An inlet horn for liquid-vapor separation and distribution in the flash zone of a cylindrical distillation tower comprising:
   (i) an elongated, arcuate, generally horizontal conduit defining an open-bottomed passageway disposed about the interior shell wall of the flash zone of the tower,
   (ii) an inlet for receiving a feed comprising liquid and vapor components,
   (iii) a closed end remote from the inlet,
   (iv) a plurality of transverse deflector vanes each of which is disposed (i) at an angle with respect to the vertical to impart a downward component of direction to the vapor component of the feed to deflect the vapor component downwards and (ii) at an angle with respect to the horizontal to impart an outward radial component of direction to the liquid component of the feed to deflect the liquid component towards the shell wall.

2. An inlet horn according to claim 1 in which the cross-sectional area of the passageway decreases from the open end to the closed end.

3. An inlet horn according to claim 1 in which the top edges of the angularly disposed transverse deflector vanes and the passageway define between them a plurality of openings of successively decreasing area from the inlet end to the closed end of the passageway.

4. an inlet horn according to claim 3 in which the vanes are staggered such that the top edges of adjacent vanes overlap.

5. An inlet horn according to claim 1 in which each deflector vane is disposed at an angle of 30° to 60° with respect to the horizontal.

6. An inlet horn according to claim 1 in which each deflector vane is disposed at an angle of 30° to 60° in the horizontal plane with respect to the tower radius, with the inner edge of each vane canted towards the feed inlet.

7. An inlet horn according to claim 6 in which the angular disposition of the vanes is about 45 degrees from the horizontal and about 45 degrees from the radius of the tower.

8. An inlet horn according to claim 1 in which the conduit comprises an inner arcuate side wall, an outer arcuate sidewall and a top wall connecting the inner and outer sidewalls to define an open-bottomed passageway of rectangular cross-section.

9. An inlet horn according to claim 8 in which the outer sidewall comprises the shell wall of the flash zone.

10. An inlet horn according to claim 1 including an inlet conduit tangential to the arcuate conduit at the feed inlet.

11. In a crude oil cylindrical distillation tower consisting of an upper rectification zone, a lower stripping zone, and a middle flash zone in which a vapor-liquid feed is fed into the flash zone through an inlet conduit peripherally disposed about the interior of the flash zone, the improvement in which the conduit comprises an elongated, generally horizontal, passageway having an open bottom, a feed inlet at one end, a closed end remote from the inlet and a plurality of angularly disposed, transverse deflector vanes across the passageway each of which is disposed (i) at an angle with respect to the vertical to impart a downward component of direction to the vapor component of the feed to deflect the vapor component downwards and (ii) at an angle with respect to the horizontal to impart an outward radial component of direction to the liquid component to deflect the liquid component of the feed towards the shell wall.

12. A distillation tower according to claim 11 in which the cross-sectional area of the passageway decreases from the open end to the closed end.

13. A distillation tower according to claim 11 in which the top edges of the angularly disposed transverse deflector vanes and the passageway define between them a plurality of openings of successively decreasing area from the inlet end to the closed end of the passageway.

14. A distillation tower according to claim 13 in which the vanes are staggered such that the top edges and lower edges of adjacent vanes overlap.

15. A distillation tower according to claim 11 in which each deflector vane is disposed at an angle of 30° to 60° with respect to the horizontal.

16. A distillation tower according to claim 11 in which each deflector vane is disposed at an angle of 30° to 60° in the horizontal plane with respect to the tower radius, with the inner edge of each vane canted towards the feed inlet.

17. A distillation tower according to claim 16 in which the angular disposition of the vanes is about 45 degrees from the horizontal and about 45 degrees from the radius of the tower.

18. A distillation tower according to claim 11 in which the conduit comprises an inner arcuate side wall, an outer arcuate sidewall and a top wall connecting the inner and outer sidewalls to define an open-bottomed passageway of rectangular cross-section.

19. A distillation tower according to claim 18 in which the outer sidewall comprises the shell wall of the flash zone.

20. A distillation tower according to claim 11 including an inlet conduit tangential to the arcuate conduit at the feed inlet.

* * * * *